US012717567B2

(12) United States Patent
Yang

(10) Patent No.: US 12,717,567 B2
(45) **Date of Patent: *Aug. 25, 2026**

(54) ENHANCED DEVICE UPDATING

(71) Applicant: FORESCOUT TECHNOLOGIES, INC., San Jose, CA (US)

(72) Inventor: Siying Yang, Cupertino, CA (US)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 18/079,651

(22) Filed: Dec. 12, 2022

(65) Prior Publication Data

US 2023/0113377 A1 Apr. 13, 2023

Related U.S. Application Data

(63) Continuation of application No. 16/887,350, filed on May 29, 2020, now Pat. No. 11,550,560, which is a (Continued)

(51) Int. Cl.
*G06F 21/00* (2013.01)
*G06F 8/65* (2018.01)
(Continued)

(52) U.S. Cl.
CPC ................ *G06F 8/65* (2013.01); *G06F 9/547* (2013.01); *H04L 41/082* (2013.01); *H04L 63/1408* (2013.01); *H04L 63/1433* (2013.01); *H04L 63/20* (2013.01); *H04L 67/34* (2013.01); *H04L 67/75* (2022.05); *H04W 12/08* (2013.01);
(Continued)

(58) Field of Classification Search
CPC ... G06F 8/65; G06F 8/71; G06F 9/547; G06F 9/5027; G06F 9/546; H04W 12/37; H04W 12/35; H04W 12/08; H04L 67/75; H04L 67/34; H04L 67/10; H04L 67/51; H04L 41/082; H04L 63/1408; H04L 63/1433
See application file for complete search history.

(56) References Cited

U.S. PATENT DOCUMENTS 6,470,450 B1 10/2002 Angford et al.
6,694,434 B1 2/2004 McGee et al.
(Continued)

FOREIGN PATENT DOCUMENTS

WO 2019156813 A1 8/2019

OTHER PUBLICATIONS

Pushpinder Kaur Chouhan et al., Software as a Service: Analyzing Security Issues, Dec. 28-29, 2014, [Retrieved on Apr. 9, 2024]. Retrieved from the internet: <URL: https://arxiv.org/ftp/arxiv/papers/1505/1505.01711.pdf> 9 Pages (1-9) (Year: 2014).*
(Continued)

*Primary Examiner* — Anibal Riveracruz
(74) *Attorney, Agent, or Firm* — Womble Bond Dickinson (US) LLP

(57) ABSTRACT

Systems, methods, and related technologies for device software monitoring and device software updating are described. In certain aspects, a device is selected based on being a smart device and a software version of associated with the software of the device is determined. The device software may then be automatically updated if newer software is available.

18 Claims, 6 Drawing Sheets

Related U.S. Application Data continuation of application No. 15/893,280, filed on Feb. 9, 2018, now Pat. No. 10,705,821.

(51) Int. Cl.

| | |
|---|---|
| ***G06F 8/656*** | (2018.01) |
| ***G06F 8/71*** | (2018.01) |
| ***G06F 9/44*** | (2018.01) |
| ***G06F 9/54*** | (2006.01) |
| ***H04L 9/40*** | (2022.01) |
| ***H04L 41/082*** | (2022.01) |
| ***H04L 67/00*** | (2022.01) |
| ***H04L 67/75*** | (2022.01) |
| ***H04W 12/08*** | (2021.01) |
| ***H04W 12/30*** | (2021.01) |
| ***H04W 12/37*** | (2021.01) |
| *G06F 9/50* | (2006.01) |
| *H04L 67/10* | (2022.01) |
| *H04L 67/51* | (2022.01) |
| *H04W 4/50* | (2018.01) |
| *H04W 4/70* | (2018.01) |
| *H04W 4/80* | (2018.01) |

(52) U.S. Cl.

CPC ........... *H04W 12/35* (2021.01); *H04W 12/37* (2021.01); *G06F 8/71* (2013.01); *G06F 9/5027* (2013.01); *G06F 9/546* (2013.01); *H04L 63/0227* (2013.01); *H04L 63/1416* (2013.01); *H04L 67/10* (2013.01); *H04L 67/51* (2022.05); *H04W 4/50* (2018.02); *H04W 4/70* (2018.02); *H04W 4/80* (2018.02)

(56) References Cited

U.S. PATENT DOCUMENTS 9,904,535 B2 2/2018 Gross et al.
9,917,903 B2 3/2018 Clernon
9,961,163 B2 5/2018 Pastor Perales et al.
10,332,005 B1 6/2019 Liao et al.
10,554,632 B2 2/2020 Lange
10,572,245 B1 2/2020 Doebel et al.
10,764,313 B1 * 9/2020 Mushtaq ................ G06N 20/00
2004/0068667 A1 4/2004 Kumhyr et al.
2005/0220126 A1 10/2005 Gervais et al.
2010/0191723 A1 7/2010 Perez et al.
2013/0227689 A1 8/2013 Pietrowicz et al.
2013/0283377 A1 * 10/2013 Das ........................ G06F 21/51 726/23
2014/0173580 A1 6/2014 McDonald et al.
2015/0189044 A1 7/2015 Pastor Perales et al.
2015/0370548 A1 * 12/2015 Ayres ........................ G06F 8/64 717/170
2016/0088010 A1 3/2016 Oliphant et al.
2017/0005820 A1 1/2017 Zimmerman et al.
2017/0033984 A1 2/2017 Lear et al.
2017/0075677 A1 3/2017 Gross et al.
2017/0078922 A1 3/2017 Raleigh et al.
2017/0123389 A1 5/2017 Baez et al.
2017/0126577 A1 5/2017 Sender et al.
2017/0149804 A1 5/2017 Kolbitsch et al.
2017/0155665 A1 6/2017 Dufour
2017/0164417 A1 6/2017 Kress et al.
2017/0171778 A1 6/2017 Britt et al.
2017/0187807 A1 6/2017 Clernon
2017/0195424 A1 7/2017 Nasir et al.
2017/0228258 A1 8/2017 Shifman et al.
2017/0299633 A1 10/2017 Pietrowicz et al.
2017/0359237 A1 12/2017 Hao et al.
2017/0364349 A1 12/2017 Conant et al.
2018/0048987 A1 2/2018 Morris
2018/0089014 A1 3/2018 Smith et al.
2018/0097690 A1 4/2018 Yocam et al.
2018/0102901 A1 4/2018 Linton et al.
2018/0103023 A1 4/2018 Linton et al.
2018/0109533 A1 * 4/2018 Thubert ................ H04L 41/082
2018/0117446 A1 5/2018 Tran et al.
2018/0117447 A1 5/2018 Tran et al.
2018/0124048 A1 5/2018 Yoo
2018/0183882 A1 6/2018 Flynn et al.
2018/0219920 A1 8/2018 Patel et al.
2018/0255175 A1 9/2018 Tran et al.
2018/0375887 A1 12/2018 Dezent et al.
2019/0019222 A1 1/2019 Agrawal et al.
2019/0089748 A1 3/2019 Manor et al.
2019/0227908 A1 * 7/2019 Munafo .............. G06F 11/0748
2019/0380037 A1 12/2019 Lifshitz et al.
2020/0012488 A1 1/2020 Koval et al.
2020/0162556 A1 * 5/2020 Wood ..................... G06Q 10/06

OTHER PUBLICATIONS

AU Examination Report dated Jun. 29, 2023 from related AU Patent Application No. 2019218747 filed Aug. 4, 2020; 2 pages.

Sang-Woo Lee et al., A Study on Smart-phone Traffic Analysis, 2011, [Retrieved on Feb. 18, 2020]. Retrieved from the Internet: <URL : https://ieeexplore.ieee.org/stamp/stamp.jsp?arnumber=6077033> 7 pages (1-7) (Year: 2011).

Arunan Sivanathan et al., Characterizing and Classifying IoT Traffic in Smart Cities and Campuses, IEEE 2017, [Retrieved on Feb. 18, 2020]. Retrieved from the internet: <URL: https://ieeexplore.ieee.org/stamp/stamp.jsp?tp=&arnumber=8116438> 6 Pages (559-564 ) (Year: 2017).

Canadian Office Action for Canadian Application No. 3,121,623 filed Jan. 23, 2019 on behalf of Forescout Technologies, INC., Date: Feb. 11, 2025, 6 pages.

Markus Miettinen et al., "IoT Sentinel: Automated Device-Type Identification for Security Enforcement in IoT", 2017 IEEE 37th International Conference on Distributed Computing Systems (ICDCS), Date: Dec. 13, 2016, XP055467286, Retrieved from the Internet: URL: https://arxiv.org/pdf/1611.04880.pdf, 11 pages.

International Preliminary Report on Patentability for International application No. PCT/US2019/014786 filed Jan. 23, 2019 on behalf of Forescout Technologies, INC., Date: Aug. 11, 2020, 7 pages.

International Search Report for International application No. PCT/U82019/014786 filed Jan. 23, 2019 on behalf of Forescout Technologies, INC., Mail Date: Mar. 26, 2019, 4 pages.

Written Opinion for International application No. PCT/U82019/014786 filed Jan. 23, 2019 on behalf of Forescout Technologies, INC., Mail Date: Mar. 26, 2019, 6 pages.

European Patent Office Communication pursuant to Rules 161(1) and 162 EPC for European Application No. 197045115 filed Jan. 23, 2019 on behalf of Forescout Technologies, INC., Date: Oct. 1, 2020, 3 pages.

European Patent Office Communication under Rule 71(3) EPC for European Application No. 19704511.5 filed Jan. 23, 2019 on behalf of Forescout Technologies, INC., Date: Jun. 28, 2022, 41 pages.

European Patent Office Decision to grant a European Patent pursuant to Article 97(1) EPC for European Application No. 197045115 filed Jan. 23, 2019 on behalf of Forescout Technologies, INC., Date: May 11, 2023, 2 pages.

* cited by examiner

ENHANCED DEVICE UPDATING

RELATED APPLICATION

This application is a continuation of U.S. Ser. No. 16/887,350, filed on May 29, 2020, now U.S. Pat. No. 11,550,560 issued on Jan. 10, 2023; which is a continuation of U.S. Ser. No. 15/893,280, filed on Feb. 9, 2018, now U.S. Pat. No. 10,705,821 issued on Jul. 7, 2020, which is herein incorporated by reference in its entirety.

TECHNICAL FIELD

Aspects and implementations of the present disclosure relate to device updating, and more specifically, to monitoring and updating devices communicatively coupled via a communication network.

BACKGROUND

As technology advances, the number and variety of devices that are connected to communications networks are rapidly increasing. Each device may have its own respective vulnerabilities which may leave the network open to compromise or other risks. Understanding the vulnerabilities on each device on a network can be useful for monitoring or securing the communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
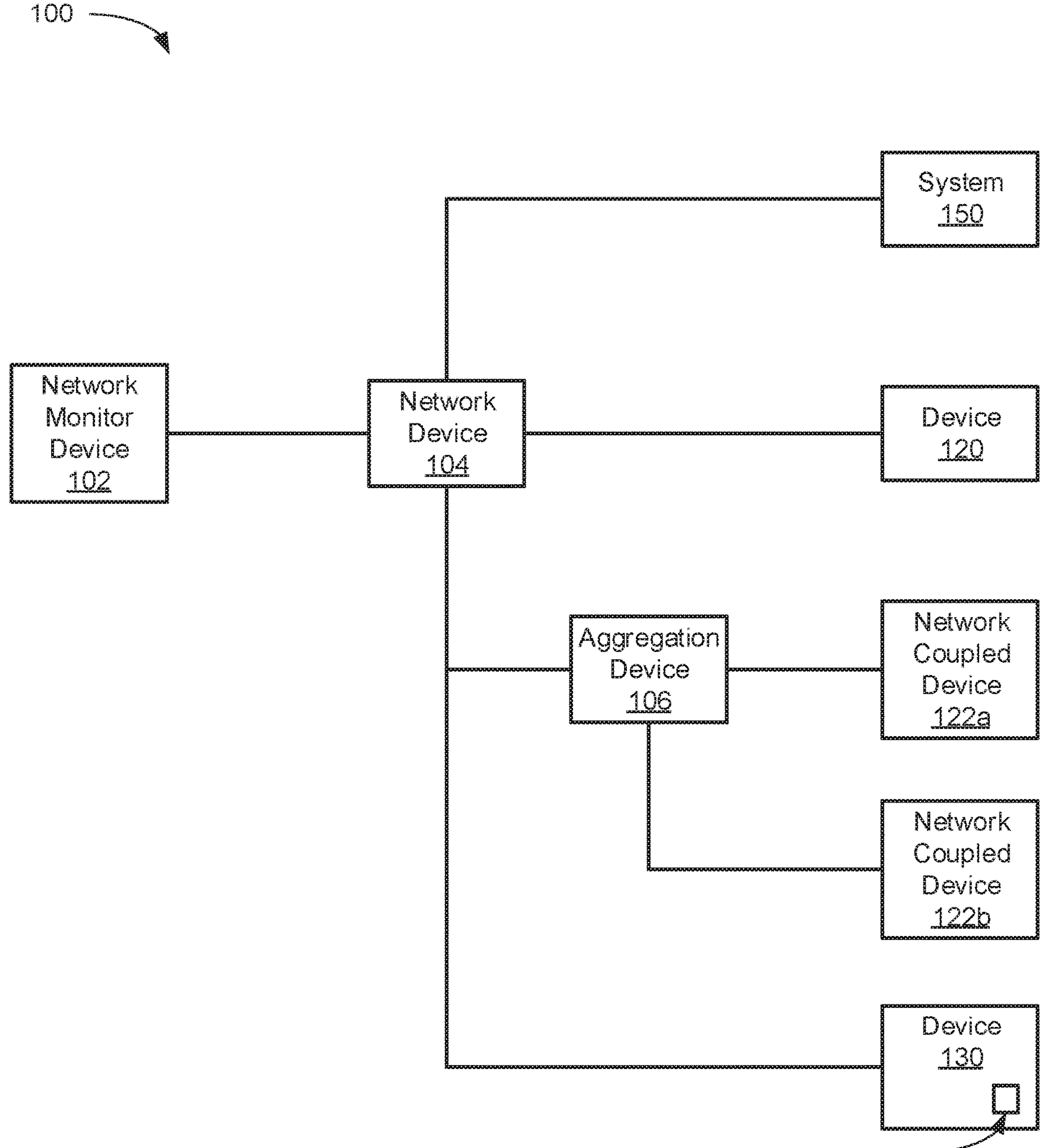
FIG. 1 depicts an illustrative communication network in accordance with one implementation of the present disclosure.

Aspects and implementations of the present disclosure are directed to device software updating. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that vulnerabilities or bugs are patched or updated. Accordingly, described herein in various implementations are systems, methods, techniques, and related technologies, which enable the ongoing monitoring of devices based on software version and in some cases taking one or more actions to update or increase security (e.g., modifying network access of a device).

Generally, IoT devices or smart devices are more vulnerable to malicious attacks than desktop computers, servers, and laptops. Security is typically not a high-priority design goal for IoT vendors. In particular, security is often a lower priority, than cost, ease-of-use, and functionality. IoT patching or updating is often more challenging than updating a desktop computer, server, or laptop. For example, if an IoT firmware vulnerability is found, under existing methodologies there is no efficient way to automatically patch the devices at a large scale. This is because 1) most IoT devices run proprietary firmware (e.g., while the firmware may be based on Linux, the overall firmware is proprietary) or embedded software, 2) many IoT devices do not support installation of a third-party software agent (e.g., which are typically a pre-requisite for third party automated software patching system), and 3) there are too many different types of IoT devices. The variety of IoT devices can make it challenging for any third party software vendor to come up with a generic "IoT software management tool" that can handle so many different types of IoT devices. The difficulty in updating firmware makes it inconvenient resulting in many devices not being updated. Generally speaking, difficulty in firmware patching is widely considered a top security issue for IoT devices.

In contrast, to the extent that there are mature product categories to handle software patching of desktop computers, servers, and laptops, such as client management tools (CMT). Even with the mature product categories, the software patching is often still a challenge on a desktop computer, server, or laptop. For example, the WannaCry ransomware attack was wide spread because of the use of legacy Windows XP™ (available from Microsoft Corporation, from Redmond, Washington).

Thus, in the world of IoT or smart devices, due to the reasons mentioned above, especially the lack of support for agent installation, there is no solution to apply automated software patching. This is a big problem for any enterprises with huge numbers of enterprise IoT (EIoT) devices, e.g., banking automated teller machines (ATM), mail-sorting machines, security cameras, heating ventilation air conditioning (HVAC) devices. Further, industrial and medical devices often have a long life cycle (e.g., between 10-30 years), so the likelihood of out of date software is much more likely because the devices are so old and the security risk persists for much longer. The out-of-date and difficult-to-patch software versions make enterprise IoT devices vulnerable to many attack vectors. For example, in some medical devices, there is an embedded computer which provides a human interface. The software of this embedded computer can become out of date and become a persistent security risk.

Embodiments provide an agentless IoT or smart device firmware updating solution that enables: 1) IoT or smart device firmware patching without requiring device agent software; 2) automated software updating; and 3) supporting as many IoT or smart devices as possible (e.g., including EIoT devices).

The ability to monitor the software version of various devices coupled to a communication network is an important part of visibility of devices on the network. Embodiments provide more than just device type classification but also device software (e.g., firmware) version detection. The device software monitored by embodiments can include operating system, firmware, open source or third party software packages, basic input output system (BIOS), etc. For example, a device may be identified as an MRI device by a particular manufacturer and further a firmware version may be identified as well. Embodiments include functionality for passive monitoring of network traffic to determine device software versions.

Beyond identifying software versions, embodiments can determine which software versions are out-of-date based on monitoring available versions of software. This may include an out-of-band monitoring approach that may include monitoring vendor websites. Based on the devices with out-of-date software, to the extent possible, updating of the software is automatically performed.

Embodiments can include a network monitor device operable to detect and classify IoT or smart devices and then detect IoT or smart device software (e.g., firmware or application) versions (e.g., using a comprehensive set of techniques, as described herein), monitor (e.g., constantly a device vendor's site) for software updates, use application programming interfaces (APIs) where possible to automatically trigger software updates, use remote command line interface (CLI) commands (e.g., via a script), where possible, to automatically trigger a software update, monitor software update activity (e.g., via traffic sniffing or proxy mode), and allow manual intervention if needed. Heuristic or machine learning is used by embodiments to learn minute differences between software versions to determine the software version (e.g., based on traffic patterns) and when the software has been updated.

Embodiments are well suited for use in networks or enterprises that have many different types of IoT or smart devices and in particular, enterprises that would like to apply consistent software updating policies. Embodiments can function and integrate with policies to provide an additional level of functionality in addition to notifying (e.g., via email, IT ticket, etc.) that a new software version is available.

Accordingly, described herein in various implementations are systems, methods, techniques, and related technologies, which enable device software monitoring and automated updating of the software. As described herein, various techniques can be used to monitor device software versions, determine available software versions, and update devices having out-of-date software.

IoT devices or smart devices are devices having functionality and further include electronic devices including at least one network or communication interfaces IoT devices or smart devices can include, but are not limited to, smartphones, tablets, refrigerators, thermostats, ATMs, mail sorting devices, cameras (e.g., an IP camera, a security camera, a 3D camera, etc.), HVAC systems, supervisory control and data acquisition (SCADA) devices, embedded devices, drones, electrical control systems, garage doors, locks, door bells, smoke or other gas sensors, and operational technology (e.g., conveyor belts, cooking equipment, pumps, sensors, cranes, robotics, etc.)

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

In some embodiments, additional sources of device information may be used to monitor device software versions. For example, a vulnerability assessment (VA) system, an advanced threat detection (ATD) system, a mobile device management (MDM) system, a firewall (FW) system, a switch system, and an access point (AP) system can be used to device software version information.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122*a-b*. The devices 120 and 130 and network coupled devices 122*a-b* may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122*a-b*. Network device 104 may be one or more network switches, access points, routers, firewalls, hubs, etc.

Network monitor device 102 may be operable for a variety of tasks including detecting or determining device software version, monitoring available device software versions (e.g., available via vendor websites), and automating update of device software (where possible). In cases where network monitor device 102 is not able to automatically update device software, it may send a notification (e.g., email, short message service (SMS), etc.) to notify an administrator to assist in determining a software version (e.g., by entering software version information), that device software should be updated, or a combination thereof. Network monitor device 102 may initiate one or more actions, as described herein, based on one or more devices having out of date or vulnerable software.

Device software as described herein includes operating system, open source software packages, third party software packages, application software (e.g., webserver software), firmware, basic input output system (BIOS), embedded software, etc., that may be installed or execute on a device. It is appreciated that network monitor device 102 can monitor both wired and wireless devices communicatively coupled to a network.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device

102 may further support high availability and disaster recovery (e.g., via one or more redundant devices).

In some embodiments, network monitor device 102 may monitor communication using a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of devices by network monitor device 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, or web interface), which are described further herein. Network monitor device 102 may be operable to use one or more APIs to communicate with aggregation device 106, device 120, device 130, or system 150. Network monitor device 102 may monitor software versions and communication dynamically, periodically, or a combination thereof.

Information from one or more external or 3rd party systems (e.g., system 150) may further be used in determining a software version of a device and used in updating software of the device. For example, a vulnerability assessment (VA) system may be queried along with an API call or command sent to aggregation device 106 (optionally) to determine the software versions present on network coupled devices 122*a-b*. External or 3rd party systems may also be used to perform a scan or a check on a device to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140.

While network monitor device 102 may be able to receive information from agent 140, installation or execution of agent 140 on many devices may not be possible, e.g., IoT or smart devices.

System 150 may be one or more external, remote, or third party systems (e.g., separate) from network monitor device 102 and may have information about devices 120 and 130 and network coupled devices 122*a-b*. System 150 may include a vulnerability assessment (VA) system, a threat detection (TD) system, a mobile device management (MDM) system, a firewall (FW) system, a switch system, an access point system, etc. Network monitor device 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other IOC.

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor device 102.

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor device 102 which may be used to monitor devices and control network access of one or more devices. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of the device being monitored in real-time which can then be used to determine a risk level of the device.

Aggregation device 106 may be configured to communicate with network coupled devices 122*a-b* and provide network access to network coupled devices 122*a-b*. Aggregation device 106 may further be configured to provide information (e.g., operating system, device software information, device software versions, device names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environments (e.g., where the types of devices on the network do not change often). The log information may include information of updates of software of network coupled devices 122*a-b*.

Figure 2:
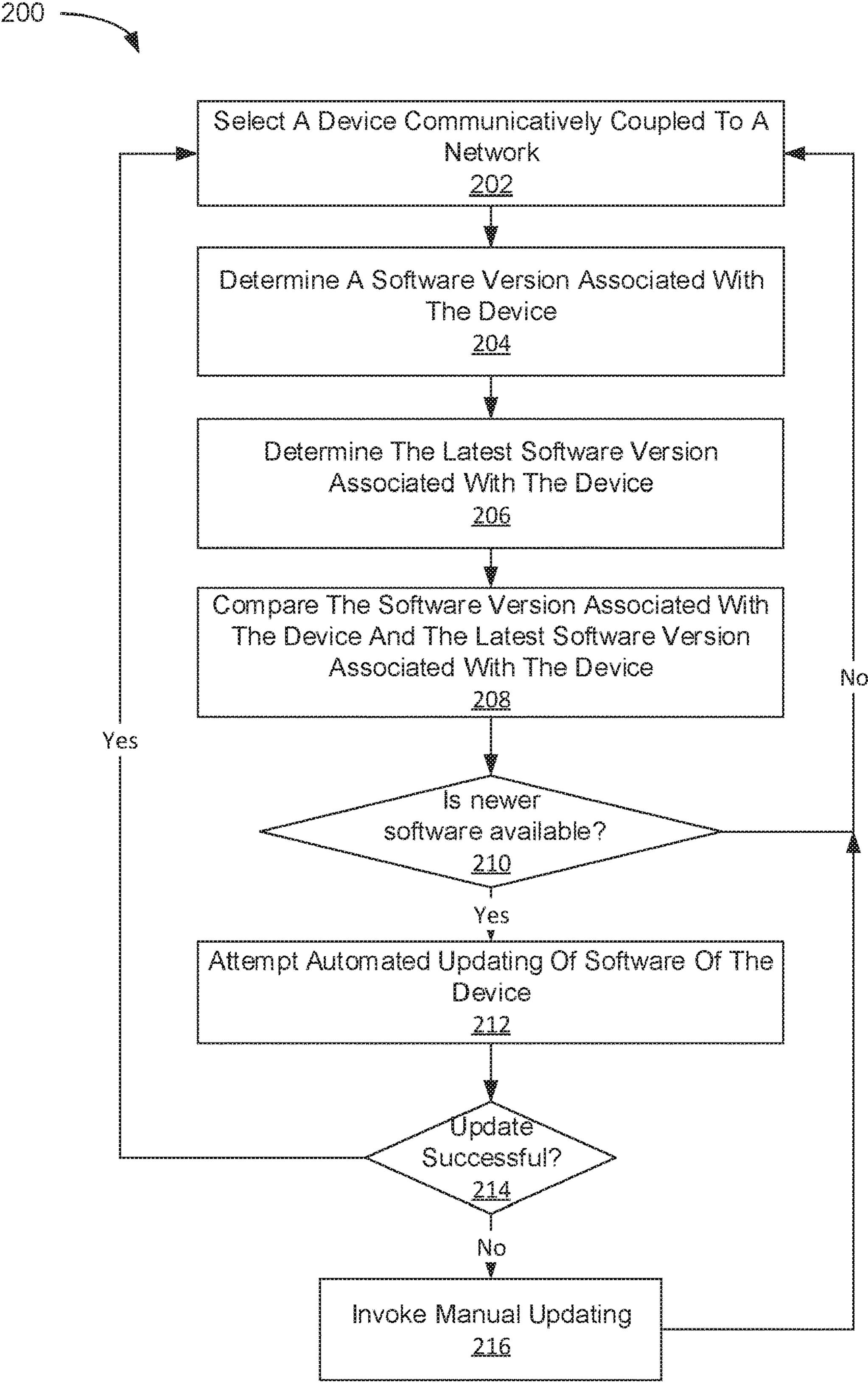
FIG. 2 depicts a flow diagram of aspects of a method for device software monitoring and updating in accordance with one implementation of the present disclosure.
Figure 3:
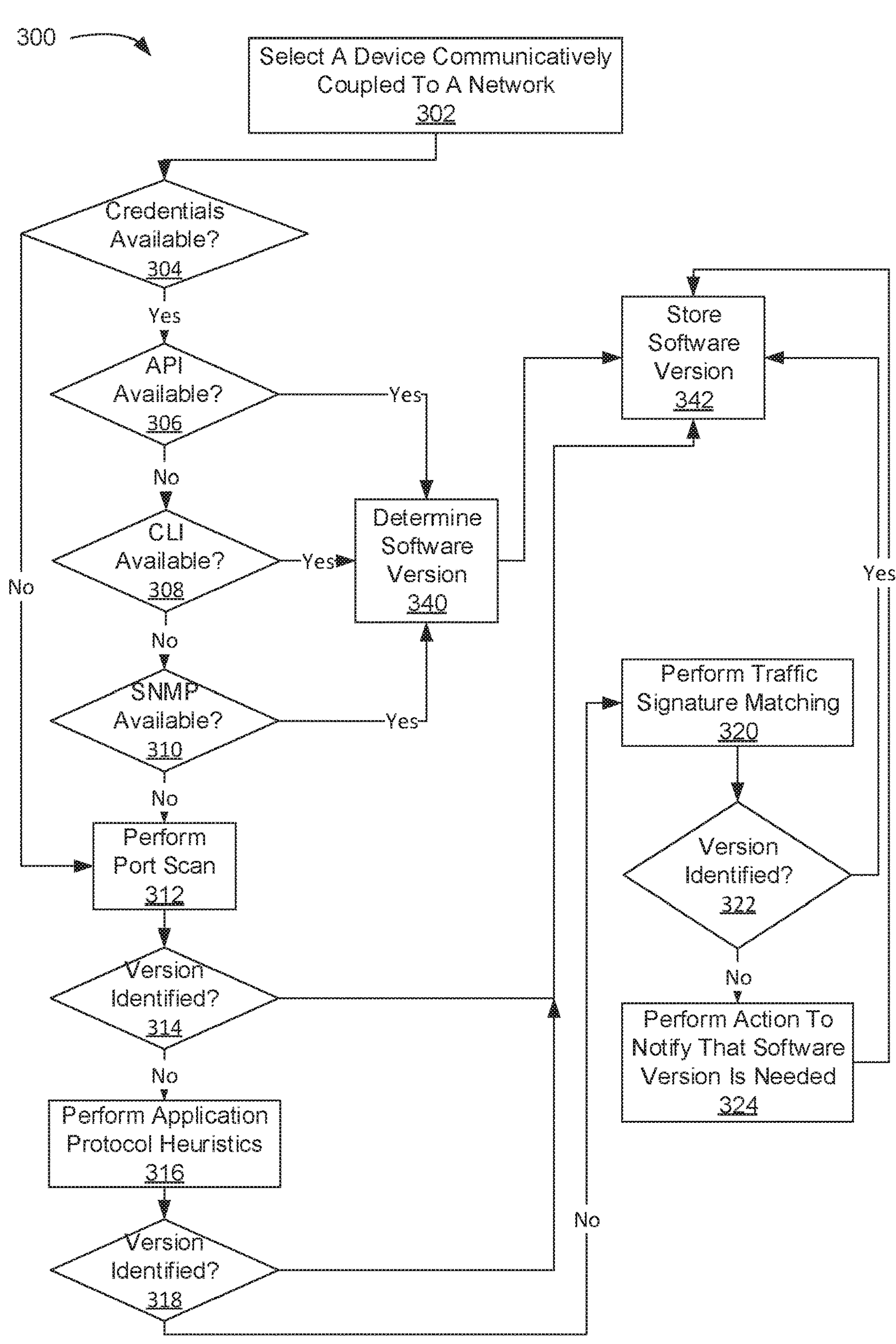
FIG. 3 depicts a flow diagram of aspects of a method for determining a device software version in accordance with one implementation of the present disclosure.
Figure 4:
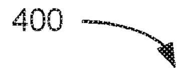
FIG. 4 depicts a flow diagram of aspects of a method for updating device software in accordance with one implementation of the present disclosure.
Figure 4:
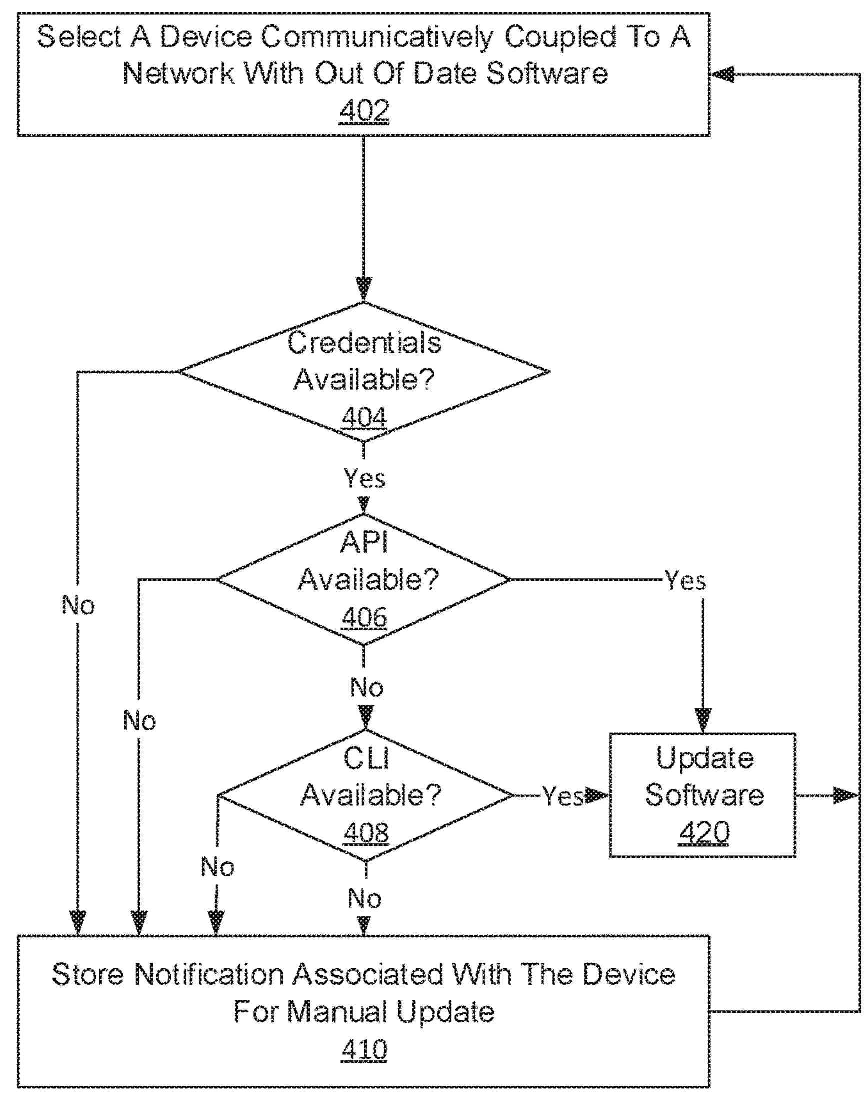

With reference to FIGS. 2-4, flowcharts 200-400 illustrate example functions used by various embodiments. Although specific function blocks ("blocks") are disclosed in flowcharts 200-400, such blocks are examples. That is, embodiments are well suited to performing various other blocks or variations of the blocks recited in flowcharts 200-400. It is appreciated that the blocks in flowcharts 200-400 may be performed in an order different than presented, and that not all of the blocks in flowcharts 200-400 may be performed.

FIG. 2 depicts a flow diagram of aspects of a method for device software monitoring and updating in accordance with one implementation of the present disclosure. Various portions of flowchart 200 may be performed by different components (e.g., components of system 500) of a device (e.g., network monitor device 102). Flowchart 200 depicts a process for monitoring one or more software versions associated with a device, determining one or more current software versions associated with the device, and optionally (e.g., according to a policy) performing an update of one or more pieces of software associated with the device.

At block 202, a device communicatively coupled to a network is selected. The device may be selected based on a device type. For example, the device may be selected based on being an IoT or smart device as determined by network monitoring device 102 (e.g., based on device classification, device identification, or a combination thereof). The device may further be selected based on being a particular model of device. Where the device identification is not available, the device may be flagged for identification by a human where identification, classification, or both is not available through automated means (e.g., network device monitor 102).

At block 204, a software version associated with the device is determined. The software version may be determined using a variety of techniques (e.g., one or more blocks of flowchart 300), as described herein. For example, the software version may be determined using one or more API calls, one or more CLI commands, or analyzing a banner or text from a login interface (e.g., webpage, SSH login prompt, etc.), as described herein.

At block 206, a latest software version associated with the device is determined. The latest software version can be determined using device identification information (e.g., manufacturer and model) to access vendor resources (e.g., websites, FTP sites, etc.) and determined in a variety of ways including determining the most recent software version based on the date of the release or the highest version number. The latest version may be determined based on monitoring one or more websites (e.g., via an out-of-band daemon) and other resources (e.g., emails) from device vendors (e.g., IoT or smart device vendors) and storing the software and version information. In some embodiments, the monitoring may be done via scrapping, scanning, or crawling of one or more vendor's websites or other resources (e.g., FTP sites, etc.).

In some embodiments, the software release interval may be tracked. For example, by checking a vendor website, the release interval (e.g., average days between software releases) can be determined based on version one of a particular software being released on a first date, version two being released on a second date, and version three being released on a third date. The release interval may be used to determine whether a particular firmware version is projected to be out-of-date (e.g., where time since the release of the particular firmware version is greater than the release interval).

In various embodiments, the device vulnerabilities are monitored (e.g., from a variety of sources, for instance, the National Institute of Standards and Technology (NIST)). In response to a new vulnerability, a scan (e.g., by network monitor device 102) may be performed of devices that are susceptible to the vulnerability. The scan may be targeted to evaluate particular devices based on device classification, device identification, or a combination thereof. This also enables automated reporting of vulnerable and out-of-date software (e.g., IoT or smart device firmware). Vulnerability information may be accessed or received from another system (e.g., network monitor device 102 receiving the information from system 150). A variety of well-known techniques may be used to monitor vendor resources (e.g., websites) for updates.

In cases where a device has an end-of-life status according to a vendor website, embodiments may determine if the latest software is running on the device and create a notification that the device has an end-of-life status according to the vendor (or other source). Embodiments may be configured to send or create increasingly urgent notifications the longer a device has been at an end-of-life status.

At block 208, the software version associated with the device is compared with the latest software version associated with the device. The comparison may be made based on release date, software version number, etc.

At block 210, whether latest available software version is newer then device software version is determined. If the latest software is newer than the software version associated with the device (e.g., installed on the device), block 212 may be performed. If the latest software is not newer than the software version associated with the device, then the method may return to block 202 to select another device.

In some embodiments, if the latest software is newer than version of software of the device, network access of the device may be restricted (e.g., for security reasons). For example, an IP camera with out-of-date software may be restricted from accessing the Internet and edge network devices to reduce the risk of the IP camera being compromised by an external attacker.

At block 212, automated updating of the software of the device is attempted. The updating of the software may be attempted using an API or a CLI where credentials are available, as described herein.

At block 214, whether the update was successful is determined, as described herein. One or more blocks of Flowchart 400 may be performed to update the software of the device. If the update was successful, block 202 may be performed. If the update was not successful, block 216 may be performed. In some embodiments, if the software update was performed, the network access restrictions (e.g., not being able to access the Internet or edge network devices) are removed (e.g., due to the vulnerability being patched).

At block 216, manual updating is invoked. This may be invoked via a notification (e.g., SMS, text, instant message, etc.) to an administrator. The traffic of the device may then be monitored to track when the device is updated including the method of the update. For example, if a small command and a three megabyte file is observed then an API likely was used versus if numerous commands are used and the file sent which would be indicative that a CLI was used to update the software.

FIG. 3 depicts a flow diagram of aspects of a method for determining a device software version in accordance with one implementation of the present disclosure. Various portions of flowchart 300 may be performed by different components (e.g., components of system 500) of a device (e.g., network monitor device 102). Flowchart 300 depicts a process for determining a software version associated with a device and storing the software version. The determination of the software version associated with the device may be determined using a variety of methods, as described herein. The methods may be triggered or performed through a centralized device (e.g., network device monitor 102). Flowchart 300 can be performed without the use of a software agent installed on a device (e.g., IoT or smart device). Flowchart 300 may be performed as part of block 204 (e.g., of FIG. 2).

At block 302, a device communicatively coupled to a network is selected. The device may be selected based on being an IoT or smart device as determined by network monitoring device 102 (e.g., based on device classification, device identification, or a combination thereof). The device may be selected from a list of devices of a particular category (e.g., IoT or smart devices).

At block 304, whether credentials are available is determined. The credentials may be stored on a device monitoring (e.g., network monitoring device 102) other devices or may be available from other devices (e.g., devices within or outside the network, for instance, cloud hosted credentials). It is appreciated that device credentials may be stored in a variety of locations and embodiments support accessing the credentials to determine software versions and update devices. If credentials are available, block 306 may be performed. If credentials are not available, block 312 may be performed.

At block 306, whether an API is available for device is determined. Whether an API interface is available may be determined by accessing a database or data store of device information (e.g., stored on or accessible by network monitor device 102). In some embodiments, the API determined may be an API that allows an API call to request the device software version. If an API is available, block 340 may be performed. If an API is unavailable, block 312 may be performed.

At block 308, whether a CLI interface is available is determined. Whether a CLI interface is available may be determined by accessing a database or data store of device information (e.g., stored on or accessible by network monitor device 102). If a CLI interface is available, block 340 may be performed. If a CLI interface is not available, block 310 may be performed.

At block 310, whether simple network management protocol (SNMP) is available is determined. Whether a SNMP interface is available may be determined by accessing a database of device information (e.g., stored on or accessible by network monitor device 102). If a SNMP interface is available, block 340 may be performed. If a SNMP interface is not available, block 312 may be performed.

At block 312, a port scan of the device is performed. The port scan may be a TCP/UDP port scan (e.g., nmap scan) of the device. The open ports of the port scan may be used to identify the software version (e.g., firmware version). For example, open ports may be compared against a database with open ports that act as signatures for respective software versions.

At block 314, whether a software version is identified is determined. This may be determined based on a match of the open ports to a database with open ports as a signature. If a software version is identified, block 342 may be performed. If a software version is not identified, block 316 may be performed.

At block 316, application protocol heuristics are performed. For example, many devices (e.g., IoT or smart devices) may support one type of web server (e.g., Apache webserver, Nginx webserver, internet information services (IIS) webserver, etc.) as a device management interface. Interactions with the web server or any other application servers running on the device can be used to determine or infer heuristically the software version. It is appreciated, that these interactions can occur without use of credentials associated with the device. For example, if a login page of a device specifies that it is using Apache webserver version 1.2 and the device is identified as an IP camera from manufacturer X, the software version may be determined based Apache webserver version 1.2 being associated with a particular firmware version for the IP camera from manufacturer X.

In some embodiments, a banner of a login prompt may be used to determine the software version. For example, requests made to ports of HTTP, file transfer protocol (FTP), and simple mail transfer protocol (SMTP) may return banners or data with information about the services and versions running on a device.

Further, in some embodiments, interactions and traffic of a device prior to and during the presentation of a login prompt or other data (e.g., webpage) may be used to identify a device based on the timing, data size of webpages, etc. For example, if a webpage is known to take approximately 0.3 seconds from request till sending of a login webpage which has a total size of one megabyte with five images that could be used to identify a particular version.

At block 318, whether a software version is identified is determined (e.g., based on the interactions with an application or a webserver). If a software version is identified, block 342 may be performed. If a software version is not identified, block 320 may be performed.

At block 320, traffic signature matching is performed. Network traffic (e.g., including patterns and characteristics) of a device may be monitored (e.g., by network monitor device 102) and used as a signature for a software version. For example, dynamic host control protocol (DHCP) traffic may be monitored an analyzed to heuristically determine or identify the software version (e.g., IoT or smart device firmware version). DHCP traffic can be monitored for a variety of parameters including an option parameter list or request parameter list and the timing of the parameters. The DHCP option parameters examined can include 1-20, 45, 47, 121, 249, and 252 along with timing and sizing of packets thereof. Based on analysis, a determination of different device software versions can be made based on the number of the options, timing, and sizing of the DHCP traffic of a device. Traffic signatures may further be determined based on different values and lengths in HTTP headers (e.g., user-agent header and other headers) and differences in the number of headers for different software versions.

In some embodiments, one or more requests are made and depending on the characteristics of the response, e.g., timing and size of the response, may be used to identify the software version. While the response timings and size of the response may have minute variations in timing and data size, various algorithm (e.g., machine learning algorithms) may be applied to identify associated software version. The software version may thus be determined based on the device's behavior.

In some embodiments, a data store with device information (e.g., pre-determined device information) that includes behavior characteristics that were determined based on analysis of a device (e.g., in a lab or in a live environment) for a particular software version. For example, an IP camera may have a first software version installed while traffic and behavior of the device is monitored while the IP camera is used. This data from the traffic and behavior monitoring is stored and analyzed (e.g., by machine learning). Then a second software version is installed and traffic and behavior of the device is monitored while the IP camera is used. This second set of data from the traffic and behavior monitoring is stored and analyzed (e.g., by machine learning) along with data associated with the first version. The results of this analysis are signatures that can be used to identify different versions of the software of the IP camera. The signatures may be based on one or more small differences in behavior between the software versions including timing of traffic, size of packets, and size of payload across one or more packets. It is appreciated that the analysis of device behavior may be an out-of-band from usage of a network monitoring device (e.g., network monitoring device 102) and the network monitoring device may download or receive updates of software version behavior signatures.

At block 322, whether a software version is identified is determined (e.g., based on a traffic or behavior device signature). If a software version is identified, block 342 may be performed. If a software version is not identified, block 324 may be performed.

At block 324, an action is performed to notify that a software version is needed. The notification may appear in a graphical user interface of a network monitoring device (e.g., network monitoring device 102) or be transmitted via email, SMS, etc. For example, a human administrator may be prompted to enter the known software (e.g., firmware) into a network monitoring device. This manually configured software version can be considered very reliable and can be used to train a machine learning algorithm to better be able to identify further device software determination heuristics (e.g., based on matching the behavior or network traffic of the device to an input software version, for instance, by a network administrator). In some embodiments, the machine learning may be offline (e.g., used in a lab or test environment). The characteristics of the device (e.g., based on the behavior, network traffic, or combination thereof) associated with the input software version may be uploaded, along with the input software version, to a centralized data store (e.g., database or cloud) thereby enabling using the characteristics to be used in other networks to determine the software version of a device.

In some embodiments, blocks 312-320 may make use of a data store (e.g., database) of device software signatures (e.g., IoT or smart device firmware signatures including firmware behavior patterns). The data store can be constructed based on information from IoT or smart device vendors (e.g., network interface card (NIC) vendor database), public domain information (e.g., fingerbank, etc.) and in house research. It is appreciated that verified information may be given preference over public information as the public information may have reduced accuracy or need to be double checked.

In various embodiments, where there is a lack of prior or pre-determined knowledge or traffic signature that can be used to identify a particular version of device software, whether the software version has changed for a certain period of time can be determined. A similar set of functionality as described herein (e.g., port scanning, protocol signature matching) can be used to examine very small differences in the traffic patterns of different versions of device software. The protocol signature matching can be based on the behavior of how the protocol is implemented (e.g., the timing, sizing, and TCP/IP header values of packets). This traffic pattern data, device behavior data, or a combination thereof can thus be used to determine whether the software version has changed.

If there are very little, if any, differences then in traffic pattern, then it may be inferred that the software device version has not changed. Further, if the traffic pattern does not change over a large period of time (e.g., one year), it may be inferred the device software is out of date. This inference may be made without checking a vendor website. For example, if there is an IP camera device that was updated about a year ago and the date of update is stored (e.g., by network monitor device 102) and the traffic patterns of the device have not changed, then the date of the last update may be compared against the update interval to determine whether the software is out-of-date.

In response, to determining that the device software has not changed for an extended period of time (e.g., several months, one or more years, etc.), a notification can be generated as described herein.

This inference can also be based on the fact that if there is a release interval pattern to software version updates (e.g., every 3 months) from a vendor, then when traffic patterns have not changed for a particular device for a period of time longer than the regular software update interval release, the device software may be inferred to be out-of-date.

At block 340, the software version of a device is determined. Where a device supports API calls, an API can be called to get the software version. Where a CLI interface is available, remote execution of one or more CLI commands on the device can be performed to update a software version (e.g., firmware or application). Where SNMP is available or supported, the SNMP database of the device can be polled to get the software version. Where an API, CLI, or SNMP are not available, an in-depth application protocol interaction can be used to determine the software version (e.g., based on block 316 and block 320).

At block 342, the software version is stored. The software version for a particular device may be stored by a network monitoring device (e.g., network monitoring device 102) which can later be used to determine if the software is out of date or a security risk based on monitoring sources of software updates (e.g., vendor websites, vulnerability websites, etc.).

In some embodiments, the software versions and any associated characteristics (e.g., traffic patterns, device behavior, etc.) may be stored in cloud based system. This can thereby help expand the information about particular software version and improve the software version identification.

FIG. 4 depicts a flow diagram of aspects of a method for updating device software in accordance with one implementation of the present disclosure. Various portions of flowchart 400 may be performed by different components (e.g., components of system 500) of a device (e.g., network monitor device 102). Flowchart 400 depicts a process for attempting to automatically update software of a device and optionally storing a notification associated with the device for a manual update. The blocks of flowchart 400 may be performed after a list of devices (e.g., IoT or smart devices) with out-of-date or vulnerable software (e.g., firmware) have been identified to automatically update the software.

At block 402, a device communicatively coupled to a network is selected. The device may be selected based on being an IoT or smart device as determined by network monitoring device 102 (e.g., based on device classification, device identification, or a combination thereof). The device may be selected from a list of devices of a particular category (e.g., IoT devices).

At block 404, whether credentials are available is determined. The credentials may be stored on a device monitoring (e.g., network monitoring device 102) other devices or may be available from other devices (e.g., devices within or outside the network, for instance, cloud hosted credentials). It is appreciated that device credentials may be stored in a variety of locations and embodiments support accessing the credentials to determine software versions and update devices. If credentials are available, block 420 may be performed. If credentials are not available, block 410 may be performed.

At block 406, whether an API is available for a device is determined. Whether an API interface is available may be determined by accessing a database or data store of device information (e.g., stored on or accessible by network monitor device 102). In some embodiments, the API determined may be an API that allows an API call to update the device software. If an API is available, block 420 may be performed. If an API is unavailable, block 410 may be performed.

At block 408, whether a CLI interface is available is determined. Whether a CLI interface is available may be determined by accessing a database of device information (e.g., stored on or accessible by network monitor device 102). If a CLI interface is available, block 420 may be performed. If a CLI interface is not available, block 410 may be performed.

At block 410, an action is performed to notify that the device need to be manually updated. The notification may appear in a graphical user interface of a network monitoring device (e.g., network monitoring device 102) or be transmitted via email, SMS, etc. For example, a human administrator may be prompted to update the software (e.g., firmware) of the device. A prompt may be presented to confirm that the device software has been updated at a particular time (e.g., based on monitoring network traffic).

In some embodiments, the updating process may be monitored (e.g., automatically) so that the software version information associated with the device is updated. The update may be monitored based on traffic sniffing or other passive traffic monitoring method or based on a monitoring device (e.g., network monitor device 102) being a proxy as the software is manually updated. If the software updates messages are in clear text (e.g., sent as clear text or if the network monitoring device is an SSL proxy), then the monitoring device may determine the software version based on the software update message (e.g., that the update was successful or is complete or text, for instance, "update to version 1.5," "hotfix 2018-10," "firmware update 3.456," etc.). The monitoring device may then store information that the device has been updated to a particular version at this particular time.

If the software update messages are encrypted (e.g., from the network monitoring device perspective), the network monitoring device can apply heuristics based on packet size pattern, time interval, time-of-day, traffic volume, and transfer rate (e.g., associated with the size of the firmware or application update), transaction volume, to infer the software version. In addition, communications prior to the encryption including network interactions in clear text may be monitored and used to determine the software version where possible. The software version may also be inferred based on software versions having different sizes. For example, if a current software version is known to have a particular size, a transfer of a file that is larger than the current software may be used to determine that the software has been updated. The time interval may be based on when a device checks for software updates. The transfer rate may also be based on the fact that different software interacts differently with a vendor's server (e.g., in a slightly different manner). Embodiments may thus use the traffic and interactions with the vendor's website to identify different software versions and software update activity.

Communication protocol behavior may change (e.g., slightly) as well which can also be used as an indicator for heuristic learning and device software version changes. For example, if there is an SSL update, then between software versions the protocol differences may be detected. In cases where SSL does not change, then SSL messages being sent by a particular version may change which will be reflected as a traffic behavior change.

A threshold (e.g., a confidence threshold) may be computed based on the similarity of observed network traffic to and from a device as compared to stored network traffic information or profile. Where the threshold is above a certain value, then the software version information associated with a device can be updated based on the traffic observed. In cases where results of the aforementioned heuristics are below the threshold, then manual input can serve as a labeled sample input to an offline machine learning process, which can train a model for software (e.g., firmware) version detection in the future. The results of can be uploaded to a centralized data store (e.g., cloud database). Embodiments thus support automated machine learning of the characteristics of update activities and monitoring based on particularly monitoring traffic after the notification that a manual device update is needed.

Optionally, there may be a message or a prompt to confirm the updating of the software of the device was completed. This message or prompt may be displayed as part of a graphical user interface or sent as a message (e.g., email, SMS, etc.).

At block 420, the software of device is updated (e.g., automatically). Where a device supports API calls, an API can be called (e.g., by network monitor device 102) to update the software. Where a CLI interface and device credentials are available, remote execution of one or more CLI commands (e.g., by network monitor device 102) on the device can be performed to update the software (e.g., firmware or application).

Figure 5:
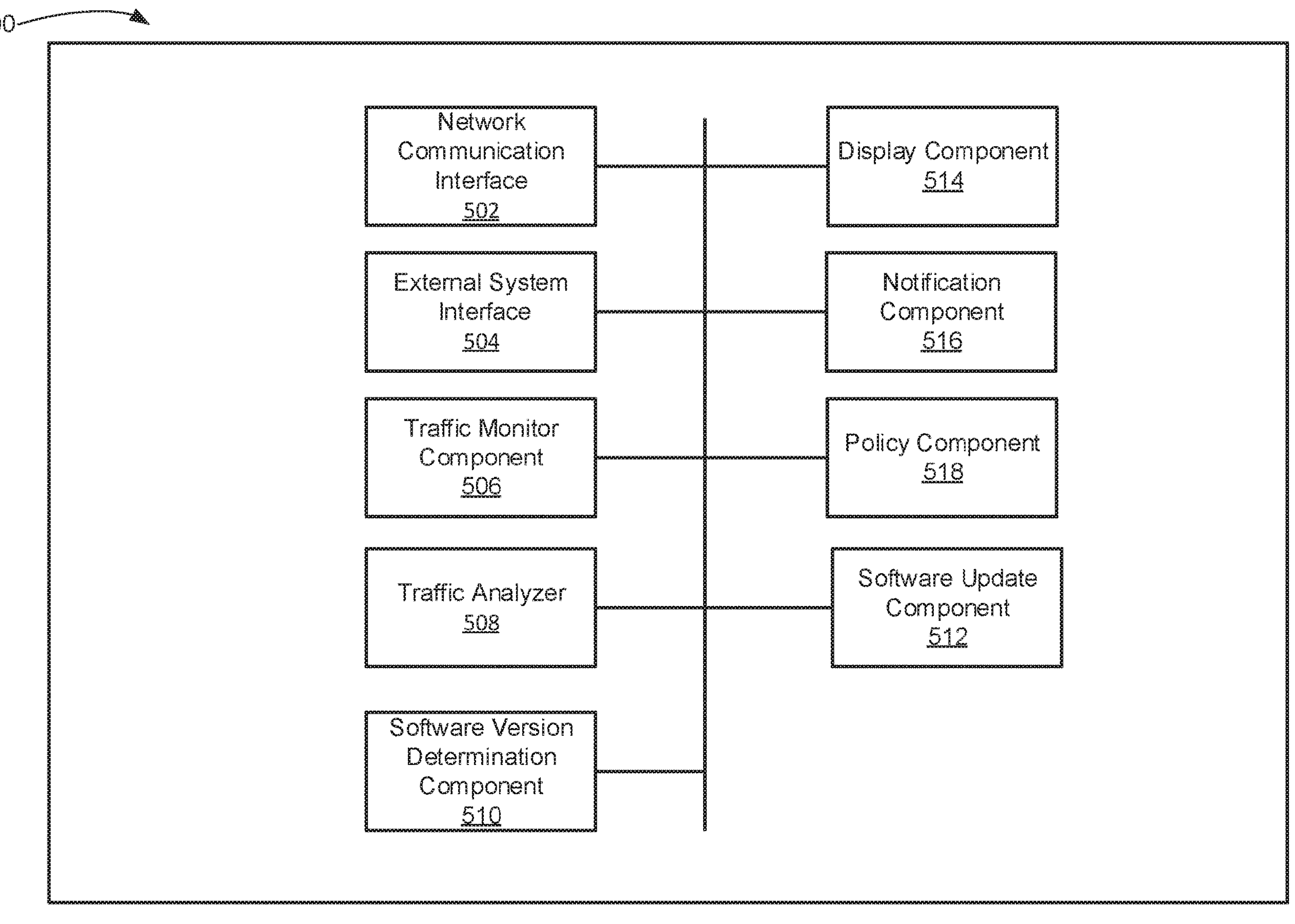
FIG. 5 depicts illustrative components of a system for device software monitoring and updating in accordance with one implementation of the present disclosure.

FIG. 5 illustrates example components used by various embodiments. Although specific components are disclosed in system 500, it should be appreciated that such components are examples. That is, embodiments of the present invention are well suited to having various other components or variations of the components recited in system 500. It is appreciated that the components in system 500 may operate with other components than those presented, and that not all of the components of system 500 may be required to achieve the goals of system 500.

FIG. 5 depicts illustrative components of a system for device software monitoring and updating in accordance with one implementation of the present disclosure. Example system 500 includes a network communication interface 502, an external system interface 504, a traffic monitor component 506, a traffic analyzer 508, a software version determination component 510, a software update component 512, a display component 514, a notification component 516, and a policy component 518. The components of system 500 may be part of a computing system or other electronic device (e.g., network monitor device 102) or a virtual machine and be operable to monitor software and update software of one or more devices communicatively coupled to a network. For example, the system 500 may further include a memory and a processing device, operatively coupled to the memory, which may perform the functions of or execute the components of system 500. The components of system 500 may access various data associated with a device being monitored in order to determine a software version associated with a device. It is appreciated that the modular nature of system 500 may allow the components to be independent and allow flexibility to enable or disable individual components or to extend/upgrade components without affecting other components thereby providing scalability and extensibility. System 500 may perform one or more blocks of flow diagrams 200-400.

Communication interface 502 is operable to communicate with one or more devices (e.g., network device 104) coupled to a network that are coupled to system 500 and receive or access information about devices (e.g., information associated with the communication of one or more devices, software versions, etc.) coupled to the network, as described herein. The communication interface 502 may be operable to work with one or more components to initiate the monitoring of a device, determination of a device software version, and updating the device software version (where an update is available).

External system interface 504 is operable to communicate with one or more third party, remote, or external systems to access information about a device with software to be monitored, updated, or a combination thereof. External system interface 504 may further store the accessed information in a data store. For example, external system interface 504 may access software version information from one or more third party systems and store the accessed information in the data store. External system interface 504 may be operable to communicate with a vulnerability assessment (VA) system, an advanced threat detection (ATD) system, a mobile device management (MDM) system, a firewall (FW) system, a switch system, an access point (AP) system, etc. External system interface 504 may query a third party system using an API or CLI. For example, external system interface 504 may query a firewall for information (e.g., software version) about a device or for a list of devices that are communicatively coupled to the firewall. In some embodiments, external system interface 504 may query a firewall or other system for information of communications associated with a device.

Traffic monitor component 506 is operable to monitor network traffic of a device being monitored (e.g., an IoT or smart device), as described herein. Traffic analyzer 508 is configured to perform analysis of network traffic (e.g., in real-time, with machine learning, etc.) to and from a device being monitored. Traffic analyzer 508 may have a packet engine operable to access packets of network traffic (e.g., passively) and analyze the network traffic. For example, packets associated with communication requests may be accessed and analyzed to determine whether a device is initiating communication to a vendor website to check for updates. The traffic analyzer 508 may be configured to perform active or passive traffic analysis or a combination thereof. The traffic analyzer 508 may further be able to access and analyze traffic logs from one or more devices (e.g., network device 104, system 150, or aggregation device 106) or from a device being monitored. The traffic analyzer 508 may further be able to access traffic analysis data associated with a device being monitored, e.g., where the traffic analysis is performed by a third party system.

Software version determination component 510 is configured to determine one or more software versions present on a device, e.g., blocks of flowchart 300, as described herein. Software update component 512 is configured to update one or more software versions present on a device, e.g., blocks of flowchart 400, as described herein.

Display component 514 is configured to optionally display a graphical user interface or other interface (e.g., command line interface) for depicting various software versions and device update status, as described herein. In some embodiments, display component 512 may display a network graph for indicating software versions associated with each device and respective update status. In some embodiments, the update status can be whether a device is not updated or not scheduled to be updated (e.g., indicated with red), whether a device is scheduled to be updated (e.g., indicated with orange), whether a device is in the process of being updated (e.g., indicated with yellow), or whether a device has been updated (e.g., indicated with green).

Notification component 516 is operable to initiate one or more notifications based on a device being in need of an update (e.g., for manual or automatic updates), being scheduled for an update (e.g., at a particular time), and being at an end-of-life status, as described herein. The notification may be any of a variety of notifications, e.g., IT ticket, email, SMS, a HTTP notification, etc., as described herein.

Policy component 518 is operable for initiating or triggering one or more remediation actions or security actions, as described herein. Policy component 518 may further be configured to perform other functions including checking compliance status, finding open ports, etc. Policy component 518 may restrict network access, signal a patch system or service (e.g., software update component 512), signal an update system or service (e.g., software update component 512), etc., as described herein. The policy component 518 may thus, among other things, invoke automatically patching, automatically updating, and automatically restrict network access of a device (e.g., that has out-of-date software).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 500 may be software stored on a non-transitory computer readable medium having instructions encoded thereon that, when executed by a processing device, cause the processing device to select a device, communicatively coupled to a network, based on a classification of the device as a smart device. The device includes a piece of software. The instructions may further cause the processing device to determine, by a processing device, a software version associated with the software of the device. In some embodiments, the software version is determined based on network traffic analysis. The instructions may further cause the processing device to determine whether there is a newer software version associated with the software of the device and in response to determining the newer software version associated with the software of the device, store an indicator of the newer software version associated with the software device. The instructions may further cause the processing device to perform automatically an update of the software associated with the device using software having the newer software version associated with the device.

In some embodiments, the update of the software associated with the device is performed without an agent executing on the device. In various embodiments, the update of the software associated with the device is performed using an application programming interface (API). In some embodiments, the update of the software associated with the device is performed using a command line interface (CLI).

Figure 6:
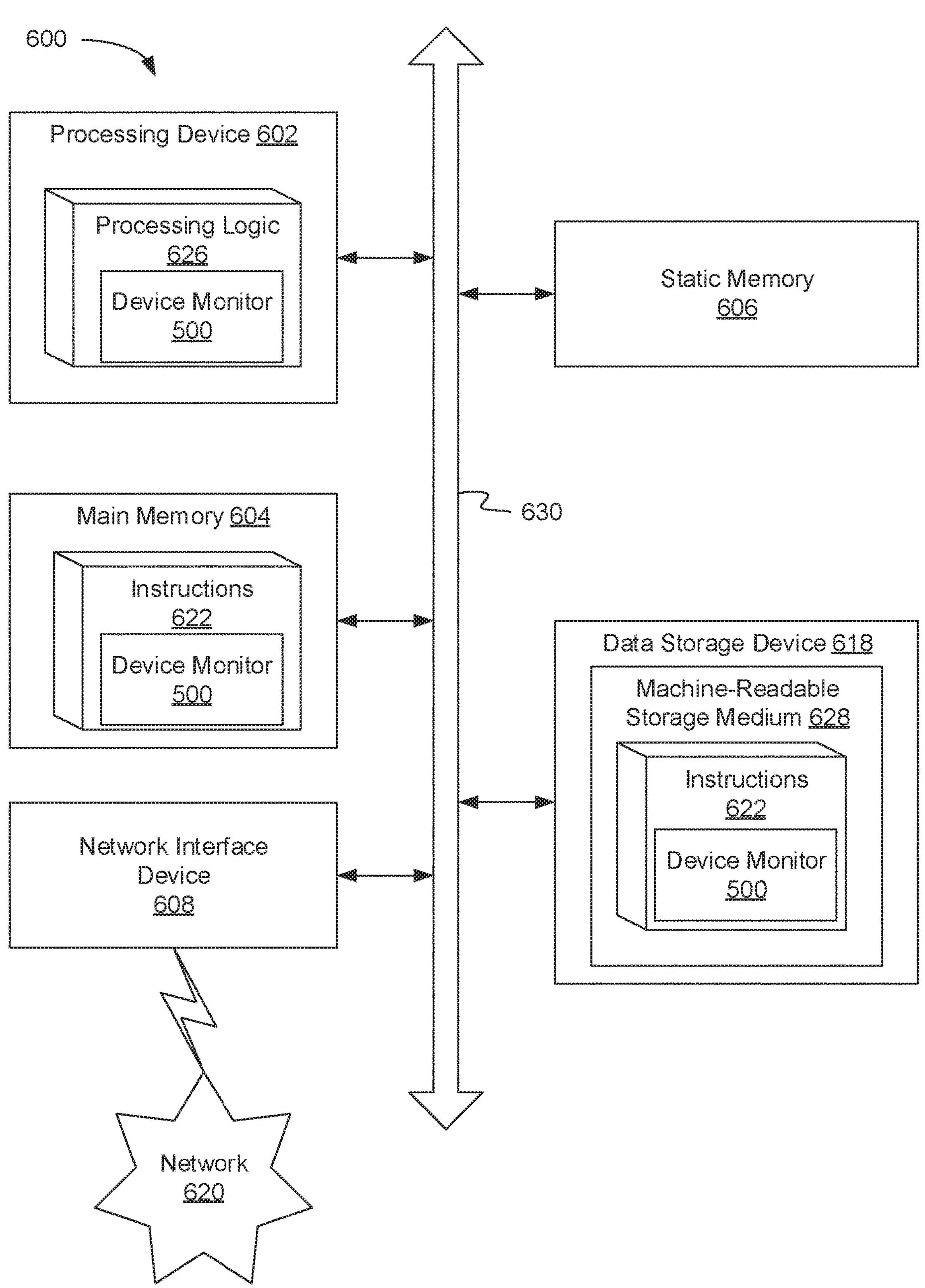
FIG. 6 is a block diagram illustrating an example computer system, in accordance with one implementation of the present disclosure.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as network monitor device 102 configured to monitor one or more devices, determine one or more device software versions, and update software of one or more devices.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of system 500 shown in FIG. 5, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute device monitor 500. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for device monitoring and updating where possible, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, performed by a processing device, comprising:

selecting a device, communicatively coupled to a network, based on a classification of the device as a smart device, wherein the device comprises a piece of software;

determining, with the processing device, a software version associated with the software of the device based on analyzing a timing and size of a network packet associated with a communication of the device;

determining whether there is a newer software version associated with the software of the device;

in response to determining the newer software version associated with the software of the device, storing an indicator of the newer software version associated with the software of the device; and performing, with the processing device, an update of the software associated with the device based on the indicator of the newer software version associated with the device, including establishing, by the processing device, an HTTPS session between the processing device and the device, and transmitting by the processing device, over the HTTPS session, an application programming interface (API) request that instructs the device to install the newer software version, or establishing, by the processing device, a shell session with the device, and issuing, through the session, a remote command line interface (CLI) command to initiate and install the update of the software onto the device.

2. The method of claim 1, wherein the update of the software associated with the device is performed without an agent executing on the device.

3. The method of claim 1 further comprising:

determining whether credentials associated with the device are available, wherein the update of the software associated with the device is performed in response to determining that the credentials associated with the device are available.

4. The method of claim 1, wherein the determining of the software version associated with the software of the device is performed using simple network management protocol (SNMP).

5. The method of claim 1, wherein the determining of the software version associated with the software of the device is performed using network traffic analysis.

6. The method of claim 1, wherein the determining of the software version associated with the software of the device is performed using application protocol analysis.

7. The method of claim 1, wherein the determining of the software version associated with the software of the device is performed using a port scan.

8. The method of claim 1, wherein the determining of the software version associated with the software of the device is further based on traffic pattern differences.

9. The method of claim 1, wherein the determining of the software version associated with the software of the device is further based on monitoring software update communications.

10. The method of claim 1, wherein the determining of the software version associated with the software of the device is further based on a traffic signature determined based on an input software version and monitoring of traffic.

11. A system comprising:

a memory; and a processing device, operatively coupled to the memory, to:

select a device, communicatively coupled to a network, based on a classification of the device as a smart device, wherein the device comprises a piece of software;

determine a software version associated with the software of the device based on analyzing a timing and size of a network packet associated with a communication of the device;

determine whether there is a newer software version associated with the software of the device;

in response to a determination of the newer software version associated with the software of the device, store an indicator of the newer software version associated with the software of the device; and perform, with the processing device, an update of the software associated with the device based on the indicator of the newer software version associated with the device including to establish, by the processing device, an HTTPS session between the processing device and the device, and to transmit by the processing device, over the HTTPS session, an application programming interface (API) request that instructs the device to install the newer software version, or to establish, by the processing device, a shell session with the device, and to issue, through the session, a remote command line interface (CLI) command to initiate and install the update of the software onto the device.

12. The system of claim 11, wherein to determine the software version associated with the software of the device is further performed based on traffic pattern differences.

13. The system of claim 11, wherein to determine the software version associated with the software of the device is performed further based on monitoring software update communications.

14. A non-transitory computer readable medium having instructions encoded thereon that, when executed by a processing device, cause the processing device to:

select a device, communicatively coupled to a network, based on a classification of the device as a smart device, wherein the device comprises a piece of software;

determine, by the processing device, a software version associated with the software of the device, wherein the software version is determined based on analyzing a timing and size of a network packet associated with a communication of the device;

determine whether there is a newer software version associated with the software of the device;

in response to determining the newer software version associated with the software of the device, store an indicator of the newer software version associated with the software of the device; and perform, with the processing device, an update of the software associated with the device based on the indicator of the newer software version associated with the device including to establish, by the processing device, an HTTPS session between the processing device and the device, and to transmit by the processing device, over the HTTPS session, an application programming interface (API) request that instructs the device to install the newer software version, or to establish, by the processing device, a shell session with the device, and to issue, through the session, a remote command line interface (CLI) command to initiate and install the update of the software onto the device.

15. The non-transitory computer readable medium of claim 14, wherein the version of the software associated with the device is further determined based on a traffic signature determined based on a software version determined during an update process.

16. The non-transitory computer readable medium of claim 14, wherein the version of the software associated with the device is further determined based on a traffic signature determined based on a software update communication.

17. The non-transitory computer readable medium of claim 14, wherein to determine the software version associated with the software of the device is further performed based on traffic pattern differences.

18. The non-transitory computer readable medium of claim 14, wherein to determine the software version associated with the software of the device is further performed based on monitoring software update communications.

* * * * *